United States Patent
Naruniec et al.

(10) Patent No.: US 11,640,676 B2
(45) Date of Patent: May 2, 2023

(54) METHOD FOR TEMPORAL STABILIZATION OF LANDMARK LOCALIZATION

(71) Applicant: DISNEY ENTERPRISES, INC., Burbank, CA (US)

(72) Inventors: Jacek Krzysztof Naruniec, Windlach (CH); Christopher Richard Schroers, Zurich (CH); Romann Matthew Weber, Uster (CH)

(73) Assignee: Disney Enterprises, Inc., Burbank, CA (US)

(*) Notice: Subject to any disclaimer, the term of this patent is extended or adjusted under 35 U.S.C. 154(b) by 355 days.

(21) Appl. No.: 17/000,755

(22) Filed: Aug. 24, 2020

(65) Prior Publication Data

US 2022/0058822 A1 Feb. 24, 2022

(51) Int. Cl.

| | |
|---|---|
| *G06T 7/73* | (2017.01) |
| *G06T 3/00* | (2006.01) |
| *G06T 3/40* | (2006.01) |
| *G06T 3/60* | (2006.01) |
| *G06T 3/20* | (2006.01) |
| *G06N 20/00* | (2019.01) |
| *G06N 5/04* | (2023.01) |
| *G06V 40/16* | (2022.01) |
| *G06F 18/21* | (2023.01) |

(52) U.S. Cl.
CPC ............ *G06T 7/73* (2017.01); *G06F 18/217* (2023.01); *G06N 5/04* (2013.01); *G06N 20/00* (2019.01); *G06T 3/0006* (2013.01); *G06T 3/20* (2013.01); *G06T 3/40* (2013.01); *G06T 3/60* (2013.01); *G06V 40/165* (2022.01); *G06V 40/171* (2022.01); *G06T 2207/20081* (2013.01); *G06T 2207/30201* (2013.01)

(58) Field of Classification Search
CPC ........... G06T 7/73; G06T 3/0006; G06T 3/20; G06T 3/40; G06T 3/60; G06T 2207/20081; G06T 2207/30201; G06T 2207/20084; G06T 7/248; G06K 9/6262; G06N 5/04; G06N 20/00; G06N 3/08; G06V 40/171; G06V 10/82; G06V 40/165; G06V 10/7747
See application file for complete search history.

(56) References Cited

PUBLICATIONS

Honari, S., Molchanov, P., Tyree, S., Vincent, P., Pal, C. and Kautz, J., 2018. Improving landmark localization with semi-supervised learning. In Proceedings of the IEEE Conference on Computer Vision and Pattern Recognition.*

(Continued)

*Primary Examiner* — Zhitong Chen
(74) *Attorney, Agent, or Firm* — Artegis Law Group, LLP

(57) ABSTRACT

Various embodiments set forth systems and techniques for training a landmark model. The techniques include determining, using the landmark model, a first landmark in a set of first landmarks associated with a first image; performing, on the first image, a first perturbation to obtain a second image; determining, using the landmark model, a second landmark in a set of second landmarks associated with the second image; determining, based on a first distance between the first landmark and the second landmark, a first loss function; and updating, based on the first loss function, a first parameter of the landmark model.

20 Claims, 6 Drawing Sheets

(56) References Cited

PUBLICATIONS

Wu, Y. and Ji, Q., 2019. Facial landmark detection: A literature survey. International Journal of Computer Vision, 127(2), pp. 115-142.*

Belhumeur, P.N., Jacobs, D.W., Kriegman, D.J. and Kumar, N., 2013. Localizing parts of faces using a consensus of exemplars. IEEE transactions on pattern analysis and machine intelligence, 35(12), pp. 2930-2940.*

Daniel DeTone et al., "SuperPoint: Self-Supervised Interest Point Detection and Description", Proceedings of the IEEE Conference on Computer Vision and Pattern Recognition Workshops pp. 224-236, 2018.

James Thewlis et al., "Unsupervised learning of object frames by dense equivariant image labelling", Advances on Neural Information Processing Systems, pp. 844-855, 2017.

Messer, et al.; XM2VTSDB: The Extended M2VTS Database; Second International Conference on Audio and Videobased Biometric Person Authentication (AVBPA'99), Washington D.C.; dated 1999; 6 pages.

Zhu, et al.; Face Detection, Pose Estimation, and Landmark Localization in the Wild; dated 2012; 8 pages.

Belhumeur, et al.; Localizing Parts of Faces Using a Consensus of Exemplars; IEEE Transactions on Pattern Analysis and Machine Intelligence; vol. 35, No. 12; dated Dec. 2013; 11 pages.

Kowalski, et al.; Deep Alignment Network: A convolutional neural network for robust face alignment; 2017 IEEE Conference on Computer Vision and Pattern Recognition Workshops; dated 2017; 10 pages.

Yang, et al.; Stacked Hourglass Network for Robust Facial Landmark Localisation; 2017 IEEE Conference on Computer Vision and Pattern Recognition Workshops; dated 2017; 9 pages.

Khan, et al.; Synergy between face alignment and tracking via Discriminative Global Consensus Optimization; 2017 IEEE International Conference on Computer Vision; dated 2017; 9 pages.

Wu, et al.; Facial Landmark Detection: A Literature Survey; International Journal of Computer Vision; dated 2018; 28 pages.

Dong, et al.; Supervision-by-Registration: An Unsupervised Approach to Improve the Precision of Facial Landmark Detectors; dated 2018; 9 pages.

Self-Supervised Stabilization of Facial Landmarks; Anonymous ECCV submission; Paper ID 100; date unknown, 11 pages.

Bodini; A Review of Facial Landmark Extraction in 2D Images and Videos Using Deep Learning; dated Feb. 13, 2019; 14 pages.

Burgos-Artizzu, et al.; Robust Face Landmark Estimation Under Occlusion; dated 2013; 8 pages.

Kingma, et al.; Adam: A Method for Stochastic Optimization; dated 2015; 15 pages.

Le, et al.; Interactive Facial Feature Localization; dated 2012; 14 pages.

Sagonas, et al.; 300 Faces In-The-Wild Challenge: database an results; dated 2016; 16 pages.

Sagonas, et al.; 300 Faces In-The-Wild Challenge: The First Facial Landmark Localization Challenge; dated 2013; 7 pages.

Shen, et al.; The First Facial Landmark Tracking In-The-Wild Challenge: Benchmark and Results; dated 2015; 9 pages.

Wei, et al.; Convolutional Pose Machines; dated 2016; 9 pages.

Yang, et al.; Facial Shape Tracking Via Spatio-Temporal Cascade Shape Regression; dated 2015; 9 pages.

* cited by examiner

METHOD FOR TEMPORAL STABILIZATION OF LANDMARK LOCALIZATION

BACKGROUND

Field of the Various Embodiments

The various embodiments relate generally to computer science and landmark localization in images and, more specifically, to a method for temporal stabilization of landmark localization.

Description of the Related Art

Many computer vision and computer graphics applications rely on landmark localization. Such applications include face swapping, face puppeteering, face recognition, face reenactment, face animation, digital avatars, or the like. Landmarks, such as facial landmarks, can be used as anchoring points for models, such as, 3D face appearance or autoencoders. Locations of localized landmarks are used, for instance, to spatially align faces. In some applications, temporary stable landmarks, such as facial landmarks, are important for enabling visual effects on faces, for tracking eye gaze, or the like.

However, precise landmark localization is a longstanding problem. For instance, facial landmark localization on image sequences often results in temporally unstable results. Such instability may be caused by various factors such as inconsistency or inaccuracy of manual ground truth labels on training data used to train the underlying landmark algorithm, insufficient training data, inaccuracies in the landmark algorithm, or the like.

The instability can result in undesired effects. For instance, instability in localized landmarks can result in degradation in face recognition performance. Such degradation can lead to unsmooth motion and manifest as trembling or jittering when a face undergoes minor changes in expression or pose across consecutive frames in an image sequence. In certain cases, the localized facial landmarks may not adhere well to anatomically defined points on the face and may drift across time. Such undesired effects can be especially amplified at high resolution, and can result in suboptimal user experience in computer vision applications.

Some facial landmark localization techniques use video sequences in an effort to improve temporal stability. These techniques leverage video data, since facial landmarks in successive video frames should differ only slightly and along smooth trajectories. In particular, due to the smooth movement of the landmarks in video, consistent training data can be extracted for training the landmark algorithms. Other facial landmark localization techniques rely on a time series regression (TSR) model to enhance the temporal coherence of the landmarks between adjacent frames. Further, other techniques are based on supervision-by-registration (SBR) that utilizes the Lucas-Kanade algorithm to track landmarks in adjacent frames and then formulates the final loss function based on the tracked information along with the ground truth data on the labeled images.

However, there are several drawbacks to these techniques. First, in these techniques, landmark positions across multiple flows must be determined used complex optical flow computations. Further, many of these methods have limited generalization capability and often struggle to generalize to different types of video sequences. Also, these methods restrict training data to video sequences making the training process more complex and computationally intensive.

Accordingly, there is a need for techniques that enable accurate localization of landmarks and temporal stability of assigned landmarks over time.

SUMMARY

One embodiment of the present invention sets forth a computer-implemented method for training a landmark model comprising determining, using the landmark model, a first landmark in a set of first landmarks associated with a first image; performing, on the first image, a first perturbation to obtain a second image; determining, using the landmark model, a second landmark in a set of second landmarks associated with the second image; determining, based on a first distance between the first landmark and the second landmark, a first loss function; and updating, based on the first loss function, a first parameter of the landmark model.

The disclosed techniques achieve various advantages over prior-art techniques. In particular, landmark models trained using the disclosed techniques achieve stable results in various applications that require handling of high-resolution video sequences, real-time landmark tracking, or the like. For instance, the disclosed methods do not require complex and expensive optical flow computations, thereby achieving improved accuracy and temporal stability with greater computational efficiency relative to prior-art approaches. Further, the disclosed techniques are simple to implement, with the stabilization loss used in training incurring minimal, if any, overheard. Further, in various embodiments, the disclosed methods do not rely on sequential data, labeled data, or video sequences. Rather, the disclosed techniques may rely, for instance, on a data set consisting of a set of unlabeled face images, and can therefore be generalized to unseen data. Since the disclosed techniques are not limited to video data, the approach allows for a much wider variety of data that can be used for training the underlying model. In addition, the disclosed methods are largely agnostic to the underlying model used to assign facial landmarks. As a result, the disclosed methods may be applicable to any trainable landmark model in order to fine-tune the model to achieve high accuracy and temporal stability. Additionally, disclosed techniques create and resolve landmark instability in individual images, thereby increasing the landmark models' robustness against image perturbations.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
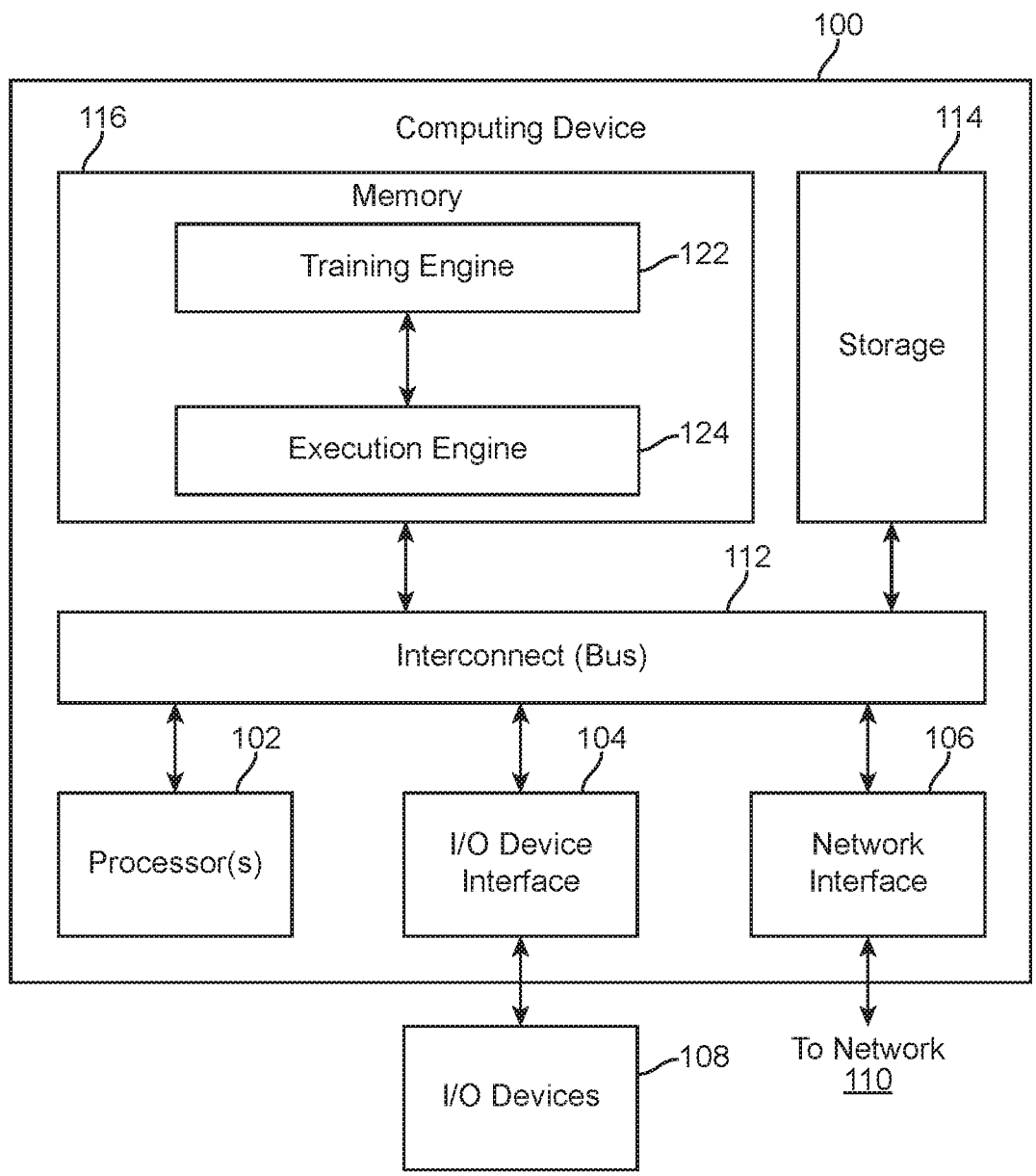
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processor(s) 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processor(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O device interface 104 enables communication of I/O devices 108 with processor(s) 102. I/O device interface 104 generally includes the requisite logic for interpreting addresses corresponding to I/O devices 108 that are generated by processor(s) 102. I/O device interface 104 may also be configured to implement handshaking between processor(s) 102 and I/O devices 108, and/or generate interrupts associated with I/O devices 108. I/O device interface 104 may be implemented as any technically feasible CPU, ASIC, FPGA, any other type of processing unit or device.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124. Training engine 122 and execution engine 124 are described in further detail below with respect to FIG. 2.

Figure 2:
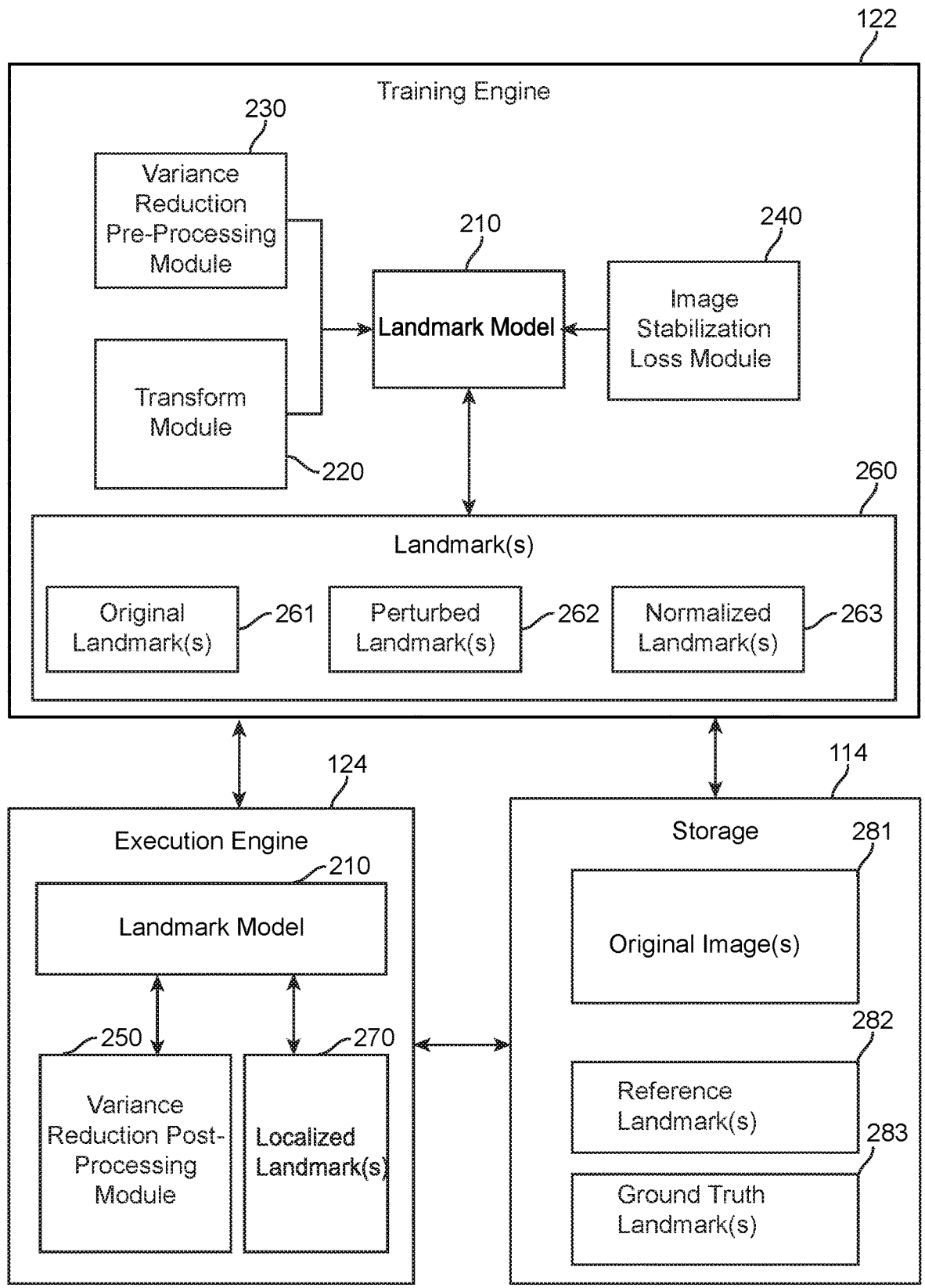
FIG. 2 is a more detailed illustration of the training engine and execution engine of FIG. 1, according to various embodiments of the present disclosure.

FIG. 2 is a more detailed illustration of training engine 122 and execution engine 124 of FIG. 1, according to various embodiments of the present disclosure. As shown, training engine 122 includes, without limitation, landmark model 210, transform module 220, variance reduction preprocessing module 230, image stabilization loss module 240, and/or landmark(s) 260.

Landmark model 210 determines one or more landmarks for an image. The landmark localization can be based on one or more identifying characteristics of or points of interest on the image. In some embodiments, where landmark model 210 operates on images including one or more faces, each landmark is an initial guess or estimate of the location of a facial landmark on an image.

Landmark model 210 includes any technically feasible machine learning model. In some embodiments, landmark model 210 includes recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In other embodiments, landmark model 210 includes functionality to perform clustering, principal component analysis (PCA), latent semantic analysis (LSA), Word2vec, and/or another unsupervised or self-supervised learning technique. In some embodiments, landmark model 210 includes regression models, support vector machines, decision trees, random forests, gradient boosted trees, naïve Bayes classifiers, Bayesian networks, hierarchical models, and/or ensemble models.

In some embodiments, landmark model 210 localizes landmarks using convolutional neural networks (CNNs) that rely on regression techniques such as cascaded regression methods, global direct regression methods, or the like. In other embodiments, landmark model 210 includes a CNN model consisting of a certain number of layers (such as four or six convolutional layers and two fully connected layers, or the like). In some embodiments, landmark model 210 includes the Deep Alignment Network, or the like.

In some embodiments, landmark model 210 includes landmark model $f_\theta$, which is parameterized by $\theta$ in such a way as to be trainable by gradient-descent methods or the like. A set of landmarks for an image is output based on the following equation:

$$f_\theta(I)=[P_1(I),P_2(I),\ldots,P_n(I)]^T, \text{ with } P_i \in R^2 \qquad (1)$$

In the above equation, for an original image I, landmark model $f_\theta$ is used to compute a set of n landmarks. While I can be an argument to the function $f_\theta$, I can also serve as an index on the set of landmarks output by $f_\theta$. $P_1(I)$, $P_2(I)$, ..., $P_n(I)$ represents the set of landmarks coordinates output for original image I. T represents a random affine transform that defines a random perturbation performed on an image. $P_i \in R^2$ represents landmark coordinates output in a 2D image plane. In some embodiments, $P_i \in R^3$, and the landmark coordinates are output in a 3D space.

Original image I includes an image selected from original image(s) 281 in storage 114. Original image(s) 281 includes any image dataset. In some embodiments, original image(s) 281 includes images divided into training datasets, testing datasets, or the like. In other embodiments, the training data set is divided into minibatches, which include small, non-overlapping subsets of the dataset. In some instances, original image(s) 281 include unlabeled images, high-definition images (e.g., resolution above 1000×1000 pixels), images with indoor or outdoor footage, images with different lighting and facial expressions, images with variations in poses and facial expressions, images of faces with occlusions, images labelled or re-labelled with a set of landmarks (e.g., 51-point landmarks, 68-point landmarks, or the like), video clips with one or more frames annotated with a set of landmarks (e.g., 68 landmarks), images with variations in resolution, videos with archive grayscale footage, or the like.

Landmarks 260 include one or more distinguishing characteristics in an image. In some embodiments, one or more landmarks 260 are based on distinguishing facial characteristics including inner and outer corners of the eyes, inner and outer corners of the mouth, inner and outer corners of the eyebrows, tip of the nose, tips of the ears, location of the nostrils, location of the chin, corners or tips of other facial marks or points, or the like. In some embodiments, the landmarks 260 include one or more interpolated marks connecting one or more facial marks or points. In some instances, any number of landmarks 260 can be localized for each facial feature such as the eyebrows, right and left centers of the eyes, nose, mouth, ears, chin, or the like. In some embodiments, the landmarks 260 are associated with one or more pixel intensity patterns around one or more facial characteristics. In some embodiments, each landmark is a 2D coordinate such as an x,y coordinate of a facial point in an image.

Landmarks 260 include, without limitation, original landmark(s) 261 (e.g., the landmarks L in an original image I); perturbed landmark(s) 262 (e.g., the landmarks L' in perturbed image I'); and normalized landmark(s) 263, (e.g., the normalized landmarks L" obtained by normalizing the perturbed landmarks 262).

In operation, landmark model 210 (e.g., landmark model $f_\theta$) computes original landmarks 261, including a set of original landmarks L in the original image defined as follows:

$$L=f_\theta(I)=[P_1(I),P_2(I),\ldots,P_n(I)] \qquad (2)$$

Landmark model 210 uses transform module 220 to perturb original image I using random affine transform T, as further described below with respect to the transform module 220, resulting in a perturbed image I'=T(I). Landmark model 210 (e.g., landmark model $f_\theta$) computes perturbed landmarks 262, including a set of perturbed landmarks L' in the perturbed image defined as follows:

$$L'=f_\theta(I')=[P_1(I'),P_2(I'),\ldots,P_n(I')] \qquad (3)$$

Landmark model 210 obtains normalized landmarks 263, including a set of normalized landmarks L" in the original coordinate space, by applying an inverse transform of the random affine transform T, resulting in normalized landmarks L" in a normalized image defined as follows:

$$L''=T^{-1}(L')=[T^{-1}P_1(I'),T^{-1}P_2(I'),\ldots,T^{-1}P_n(I')] \qquad (4)$$

Training engine 122 trains or retrains machine learning models, such as landmark model 210, to improve temporal stability of localized landmarks. Temporal stability is achieved when landmark model 210 produces consistent results on a given image even if the image is perturbed by a random transformation. For instance, landmarks assigned to a perturbed image associated with an original image should precisely match those assigned to the original image after an inverse of the random transform is applied. In another instance, temporal stability is achieved when training results in minimization of the distance between the normalized position of the aligned landmarks in the original image and the perturbed image associated with the original image.

In one instance, training engine 122 retrains the weights of an existing landmark model 210. In another instance, training engine 122 trains a separate stabilizing network that stabilizes initial estimates of landmarks 260 generated by an existing landmark model 210. In various embodiments, training engine 122 performs unsupervised or self-supervised training based on a set of unlabeled training images included in original images 281.

In operation, during training, landmark model 210 computes a set of original landmarks 261 in an original image 281. Transform module 220 performs one or more perturbations on the original image 281 to obtain a set of perturbed images associated with the original image 281. Transform module 220 obtains a set of normalized landmarks 263 in a set of normalized images. Variance reduction pre-processing module 230 averages the landmark coordinates in the set of normalized landmarks 263. Variance reduction pre-processing module 230 updates a set of reference landmarks 282 using the set of normalized landmarks 263.

Training proceeds with image stabilization loss module 240 using landmark model 210 to localize original landmarks 261 in an original image 281, perturbed landmarks 262 in a perturbed image associated with the original image 281, and normalized landmarks 263 derived based on the perturbed landmarks 262 in the perturbed image associated with the original image 281. In one instance, image stabilization loss module 240 calculates an error associated with stability of landmark model 210 based on the difference between the original landmarks 261 and the normalized landmarks 263. In another instance, image stabilization loss module 240 calculates an error associated with accuracy of landmark model 210 based on the difference between the original landmarks 261 and the set of reference landmarks produced by variance reduction pre-processing module 230. Image stabilization loss module 240 trains landmark model 210 in order to minimize a loss function. In some embodiments, image stabilization loss module 240 repeats the training process for multiple iterations until a threshold condition is achieved.

The following discussion provides further details of transform module 220, variance reduction pre-processing module 230, and image stabilization loss module 240 with respect to the training process outlined above.

Transform module 220 applies one or more perturbations to an original image 281 to generate one or more perturbed images associated with the original image 281. In some embodiments, each image in the set of original image(s) 281 undergoes a different perturbation. The perturbations include one or more random affine transforms T, such as translation (e.g., diagonally, along the x axis, along the y axis, or the like), scaling (e.g., zooming in, zooming out, or the like), rotation (e.g., around the x axis, y axis, z axis, or the like), and/or other types of affine transformations that can be applied to an original image to produce a perturbed image associated with the original image 281. In some embodiments, the perturbation or degradation for each image varies for each training epoch. In some embodiments, the degradations or perturbations includes partial obstruction, tilting, or the like.

Transform module 220 may perturb an original image 281 by a predetermined amount, (e.g., a rotation of 30 degrees), a random amount (e.g., a translation of a random amount along the x or y axis), or a combination of fixed and random amounts (e.g., a random translation diagonally, followed by a rotation of 20 degrees, scaling the size of the original image by a fixed scale factor), or the like. In some embodiments, the perturbations may include a series of perturbations such as a predetermined number of random translations followed by a predetermined number of random rotations, a predetermined number of random rotations followed by a predetermined number of random translations, a predetermined number of fixed translations followed by a predetermined number of random rotations, a predetermined number of fixed rotations followed by a predetermined number of random translations, a predetermined number of fixed translations followed by a predetermined number of fixed rotations, or a predetermined number of fixed rotations followed by a predetermined number of fixed translations.

In some embodiments, transform module 220 perturbs an original image 281 by modifying a bounding box associated with the image. In some embodiments, the modification is performed on a region bound by the bounding box. In one instance, transform module 220 generates a bounding box associated with the original image 281, where the bounding box surrounds one or more objects in the original image 281. For example, if the original image 281 includes a face, transform module 220 generates a bounding box surrounding the face in the image. The bounding box can be a rectangle, square, circle, polygon, or other appropriate geometric shape. In some embodiments, the bounding box represents the location of a certain percentage of a facial region or a facial shape.

In some embodiments, transform module 220 applies one or more perturbations to the bounding box associated with an image. In some instances, one or more perturbations applied to the bounding box include one or more adjustments to the position of the bounding box by a predefined fraction of its length or width (e.g., 5% of the bounding box width) in one or more directions in the image plane. In some embodiments, the perturbation results in the bounding box capturing all or a predefined percentage of an object, such as a face in the image. In some embodiments, the perturbation applied to the bounding box involves translation of the bounding box by a certain amount along the x axis, y axis, diagonally, or the like. In some embodiments, the perturbation applied to the bounding box involves changes in the size of the bounding box.

For a given perturbed image associated with an original image 281, transform module 220 obtains a normalized image by applying to the perturbed image an inverse transform of the random affine transform T that was applied to the original image 281. Each random affine transform T can be inverted by performing an inverse of the transform in order to obtain a normalized image. In one instance, the similarities may be computed by matching an array of pixel intensity values in the perturbed image against an array of pixel intensity values in the original image 281 based on the facial characteristics. In another instance, transform module 220 obtains the normalized image by resizing, shifting, or rotating the perturbed image so that one or more positions of the facial features match the positions in the original image 281.

Variance reduction pre-processing module 230 reduces variance in landmarks generated by landmark model 210 for a given perturbed image associated with an original image. As further described below, variance reduction pre-processing module 230 uses transform module 220 to perform a series of perturbations to an original image to obtain a set of perturbed images. Variance reduction pre-processing module 230 uses landmark model 210 to localize landmarks in the set of perturbed images. Variance reduction pre-processing module 230 uses transform module 220 to obtain a normalized image corresponding to each perturbed image, and to obtain a set of normalized landmarks 263 for each normalized image. Variance reduction pre-processing module 230 averages the landmark coordinates for each normalized landmark in the set of normalized landmarks 263. Variance reduction pre-processing module 230 determines a variance between landmark coordinates for each original landmark 261 in the original image 281 and average landmark coordinate for each corresponding normalized landmark 263 in the normalized image. Variance reduction pre-processing module 230 updates a set of reference landmarks using the set of normalized landmarks 263.

Variance reduction pre-processing module 230 uses transform module 220 to perform a series of perturbations to an original image 281 to obtain a set of perturbed images associated with the original image 281 (e.g., nine perturbed images generated through nine perturbations, or the like). In some embodiments, one or more perturbations in the series of perturbations are applied to a bounding box of the original image 281. In some embodiments, the number of perturbations is based on the resolution of the original image 281 (e.g., nine perturbations for a megapixel-resolution image).

Variance reduction pre-processing module 230 uses landmark model 210 to localize landmarks in the set of perturbed images generated through the series of perturbations. Variance reduction pre-processing module 230 determines a set of perturbed landmarks 262 in the set of perturbed images associated with the original image 281 using landmark model 210. In some embodiments, the set of perturbed landmarks 262 is an initial guess or estimate of the predicted locations of facial landmarks in the set of perturbed images.

Variance reduction pre-processing module 230 uses transform module 220 to apply an inverse of random transform T to each perturbed image to obtain a normalized image. Variance reduction pre-processing module 230 uses transform module 220 to obtain a set of normalized landmarks 263 for each normalized image corresponding to each perturbed image associated with the original image 281, with each normalized landmark 263 in the normalized image representing the coordinate for each corresponding perturbed landmark 262 in the original coordinate space.

Variance reduction pre-processing module 230 averages the landmark coordinates for each normalized landmark in the set of normalized landmarks 263. Variance reduction pre-processing module 230 calculates an average or mean coordinate for each landmark in the set of normalized landmarks 263. In some embodiments, variance reduction pre-processing module 230 trains landmark model 210 multiple times on a plurality of perturbed images associated with the original image 281, normalizes the perturbed images to obtain a plurality of normalized images, obtains a plurality of normalized landmarks 263 for each normalized image, and averages the obtained results for each normalized landmark 263.

Variance reduction pre-processing module 230 determines a variance between landmark coordinates for each original landmark 261 in the original image 281 and the average or mean landmark coordinate for each corresponding normalized landmark in the set of normalized landmarks 263. To determine a variance for each landmark, variance reduction pre-processing module 230 determines one or more statistical parameters associated with landmark coordinates (e.g., mean location, or the like) for each original landmark 261 prior to a perturbation. Variance reduction pre-processing module 230 determines a distance between the one or more statistical parameters associated with landmark coordinates of each original landmark 261 and the average or mean coordinate for each landmark in the set of normalized landmarks 263. In some embodiments, variance reduction pre-processing module 230 determines a distance between the one or more statistical parameters associated with landmark coordinates of each original landmark 261 and the landmark coordinates each corresponding normalized landmark 263 after one or more perturbations.

In some embodiments, variance reduction pre-processing module 230 determines a distance between one or more statistical parameters associated with landmark coordinates of ground truth landmarks 283 and the landmark coordinates of each corresponding original landmark 261. Ground truth landmarks 283 include annotations on ideal or expected landmark positions on the original image, or the like. In some embodiments, variance reduction pre-processing module 230 determines a distance between one or more statistical parameters associated with landmark coordinates of ground truth landmarks and the average or mean coordinate for each landmark in the set of normalized landmarks 263.

Variance reduction pre-processing module 230 updates a set of reference landmarks using the set of normalized landmarks 263. In some embodiments, the set of reference landmarks is based on the localized original landmarks 261 in the original image 281. In some embodiments, the set of reference landmarks is used to produce an improved ground truth reference, L*(I), for each image I. In some embodiments, the set of reference landmarks is used to define reference anchor points (e.g., initial estimates of the facial pose based on corners of the eyes, corners of the mouth, or the like) during training of landmark model 210.

In some embodiments, one or more parameters of landmark model 210 are updated for each perturbation. For instance, variance reduction pre-processing module 230 uses image stabilization loss module 240 to calculate a loss function, as further described below. Based on the calculated loss function, variance reduction pre-processing module 230 uses image stabilization loss module 240 to update the model parameters of landmark model 210 at each training iteration to reduce the value of the mean squared error for the loss function. In some embodiments, variance reduction pre-processing module 230 uses image stabilization loss module 240 to perform an update by propagating the loss backwards through landmark model 210, thereby adjusting parameters of the models or weights on connections between neurons of the neural network.

Image stabilization loss module 240 processes landmarks 260 output by landmark model 210 to further improve the stability of those landmarks 260. In some embodiments, image stabilization loss module 240 uses the set of reference landmarks output by variance reduction pre-processing module 230 to improve the accuracy of landmarks 260 output by landmark model 210.

Image stabilization loss module 240 uses landmark model 210 to localize landmarks L in an original image I, landmarks L' in perturbed image I', and normalized landmarks L" as described above with respect to landmark model 210.

$$L = f_\theta(I) = [P_1(I), P_2(I), \ldots, P_n(I)] \tag{2}$$

$$L' = f_\theta(I') = [P_1(I'), P_2(I'), \ldots, P_n(I')] \tag{3}$$

$$L'' = T^{-1}(L') = [T^{-1}P_1(I'), T^{-1}P_2(I'), \ldots, T^{-1}P_n(I')] \tag{4}$$

Image stabilization loss module 240 calculates an error associated with stability of landmark model 210 based on the difference between the landmarks L localized in the original image and the normalized landmarks L" derived based on the landmarks L' in the perturbed image associated with the original image. In some embodiments, the difference between the localized landmarks in original image and the normalized image may be calculated to obtain an error using the following equation:

$$\begin{bmatrix} P_1 \\ P_2 \\ \ldots \\ P_n \end{bmatrix} - \begin{bmatrix} T^{-1}(P'_1) \\ T^{-1}(P'_2) \\ \ldots \\ T^{-1}(P'_n) \end{bmatrix} = \begin{bmatrix} R_1 \\ R_2 \\ \ldots \\ R_n \end{bmatrix} \tag{5}$$

In the above equation, $P_1(I), P_2(I), \ldots, P_n(I)$ represent the coordinates of the set of landmarks L in the original image; $T^{-1}P_1(I'), T^{-1}P_2(I'), \ldots, T^{-1}P_n(I')$ represent the coordinates of the normalized landmarks L" derived based on the landmarks L' in the perturbed image; and $R_1, R_2, \ldots, R_n$ represent the error in the landmark outputs in the perturbed image relative to the original image.

Image stabilization loss module 240 calculates an error associated with accuracy of landmark model 210 based on the difference between the landmarks L localized in the original image and the improved ground truth reference, L*(I) produced by variance reduction pre-processing module 230. In some embodiments, $G_1, G_2, \ldots, G_n$ represent the error in the landmark outputs in the original image relative to the original image.

In some embodiments, such as when a self-supervised learning techniques is used, for a set of N images I, the loss function can be determined by the following equation:

$$\mathcal{L}_f(\theta) = \frac{1}{N} \sum_{I \in \mathcal{I}} G(I; f, \theta) + w_{ISL} R(I; f, \theta) \quad (6)$$

In the above function, $G(I;f,\theta)=\|L(I)-L^*(I)\|_F$ represents the Frobenius norm of the errors in the landmark outputs relative to the reference set L*, and can be a measure of the accuracy of the returned landmarks. In some embodiments, $R(I;f,\theta)=\|L''(I)-L(I)\|_F$ represents the norm of the errors of the landmark outputs relative to the landmarks in the original image, and can represent a measure of the stability of the returned landmarks. In some embodiments, $w_{ISL}$ represents a hyperparameter controlling the image stabilization loss component's relative contribution to the loss.

In some embodiments, such as when an unsupervised training technique is used, an initial loss function can be defined as:

$$e(I,EF)=\|L''-L\| \quad (7)$$

In some embodiments, the loss function is minimized for a set of N images I, resulting in a final loss function:

$$\min\left(\sum_{I_n \in N} e(I_n, EF)\right) \quad (8)$$

This effectively minimizes:

$$\operatorname*{argmin}_{f} \sum_{I_n \in N} \|f(I_n) - (T^{-1} \circ f \circ T)(I_n)\| \quad (9)$$

Image stabilization loss module 240 trains landmark model 210 in order to minimize the loss function. In some embodiments, image stabilization loss module 240 performs the training using stochastic gradient descent, stochastic optimization method, or the like. In some embodiments, image stabilization loss module 240 computes the gradient of the loss function with respect to the weights of the neural network comprising landmark model 210, and updates the weights by taking a step in a direction opposite to the gradient. In one instance, the magnitude of the step is determined by a training rate, which can be a constant rate (e.g., a step size of 0.001, or the like).

In some embodiments, image stabilization loss module 240 updates the model parameters of landmark model 210 at each training iteration to reduce the value of the mean squared error for the loss function. In some embodiments, the update is performed by propagating the loss backwards through landmark model 210 to adjust parameters of the model or weights on connections between neurons of the neural network.

In some embodiments, image stabilization loss module 240 repeats the training process for multiple iterations until a threshold condition is achieved. In some embodiments, the threshold condition is achieved when the training process reaches convergence. For instance, convergence is reached when the mean squared error for the loss function changes very little or not at all with each iteration of the training process. In another instance, convergence is reached when the mean squared error for the loss function stays constant after a certain number of iterations. In some embodiments, the threshold condition is a predetermined value or range for the mean squared error associated with the loss function. In some embodiments, the threshold condition is a predetermined value or range for the error associated with stability of landmark model 210. In some embodiments, the threshold condition is a certain number of iterations of the training process (e.g., 50 epochs, 800 epochs), a predetermined amount of time (e.g., 8 hours, 10 hours, 40 hours), or the like.

In some embodiment, image stabilization loss module 240 trains landmark model 210 using one or more hyperparameters. Each hyperparameter defines "higher-level" properties of landmark model 210 instead of internal parameters of landmark model 210 that are updated during training of landmark model 210 and subsequently used to generate predictions, inferences, scores, and/or other output of landmark model 210. Hyperparameters include a learning rate (e.g., a step size in gradient descent), a convergence parameter that controls the rate of convergence in a machine learning model, a model topology (e.g., the number of layers in a neural network or deep learning model), a number of training samples in training data for a machine learning model, a parameter-optimization technique (e.g., a formula and/or gradient descent technique used to update parameters of a machine learning model), a data-augmentation parameter that applies transformations to features inputted into landmark model 210 (e.g., scaling, translating, rotating, shearing, shifting, and/or otherwise transforming an image), a model type (e.g., neural network, clustering technique, regression model, support vector machine, tree-based model, ensemble model, etc.), or the like.

Execution engine 124 includes functionality to execute the trained machine learning model output by the training engine 122. Execution engine 124 applies a trained machine learning model, such as landmark model 210, generated by training engine 122 to assign landmarks to one or more images. Execution engine 124 is used to test the stability of landmark model 210 generated by training engine 122 using images stored in storage 114, such as original image(s) 281, or the like. In some embodiments, execution engine 124 executes landmark model 210 to localize landmarks in a perturbed image associated with an original image, and determines whether the localized landmark in the perturbed image coincides with the location of the localized landmarks in the original image. Execution engine 124 includes, without limitation, landmark model 210, variance reduction post-processing module 250, and/or localized landmark(s) 270.

Variance reduction post-processing module 250 improves landmark results by reducing variance in assigned facial landmarks. In some embodiments, the variance reduction post-processing module 250 further improves results by reducing variance in landmark assignments. In some embodiments, variance reduction post-processing module 250 further stabilizes the final results obtained by the image stabilization loss module 240 in a manner similar to that disclosed above with respect to variance reduction pre-processing module 230. For instance, variance reduction post-processing module 250 uses landmark model 210 to localize landmarks in each original image, and in a set of perturbed images associated with the original image. In another instance, variance reduction post-processing module 250 uses transform module 220 to generate a set of normalized images, and then averages the landmark coordinates for each normalized landmark in the set of normalized landmarks. Variance reduction post-processing module 250 updates landmarks output by landmark model 210 using the obtained set of normalized landmarks.

Localized landmarks 270 include, without limitation, landmarks output by landmark model 210 when executed by execution engine 124. In some embodiments, localized landmarks 270 include landmarks assigned by landmark model 210 to one or more images such as original image(s) 281, or the like.

In some embodiments, training engine 122 can apply the disclosed solution as a fine-tuning procedure on an existing pre-trained model such as a parameterized landmark model trainable, for example, via gradient descent. In some embodiments, training engine 122 retrains the weights of an existing model. In some embodiments, training engine 122 adds and trains a separate "stabilizing" network that is responsible for stabilizing the results from the initial estimation. In some embodiments, the disclosed solution modifies a landmark localization procedure by averaging multiple results over different perturbations. In some embodiments, training engine 122 uses variance reduction post-processing techniques to improve landmark results by reducing variance in assigned facial landmarks.

Figure 3:
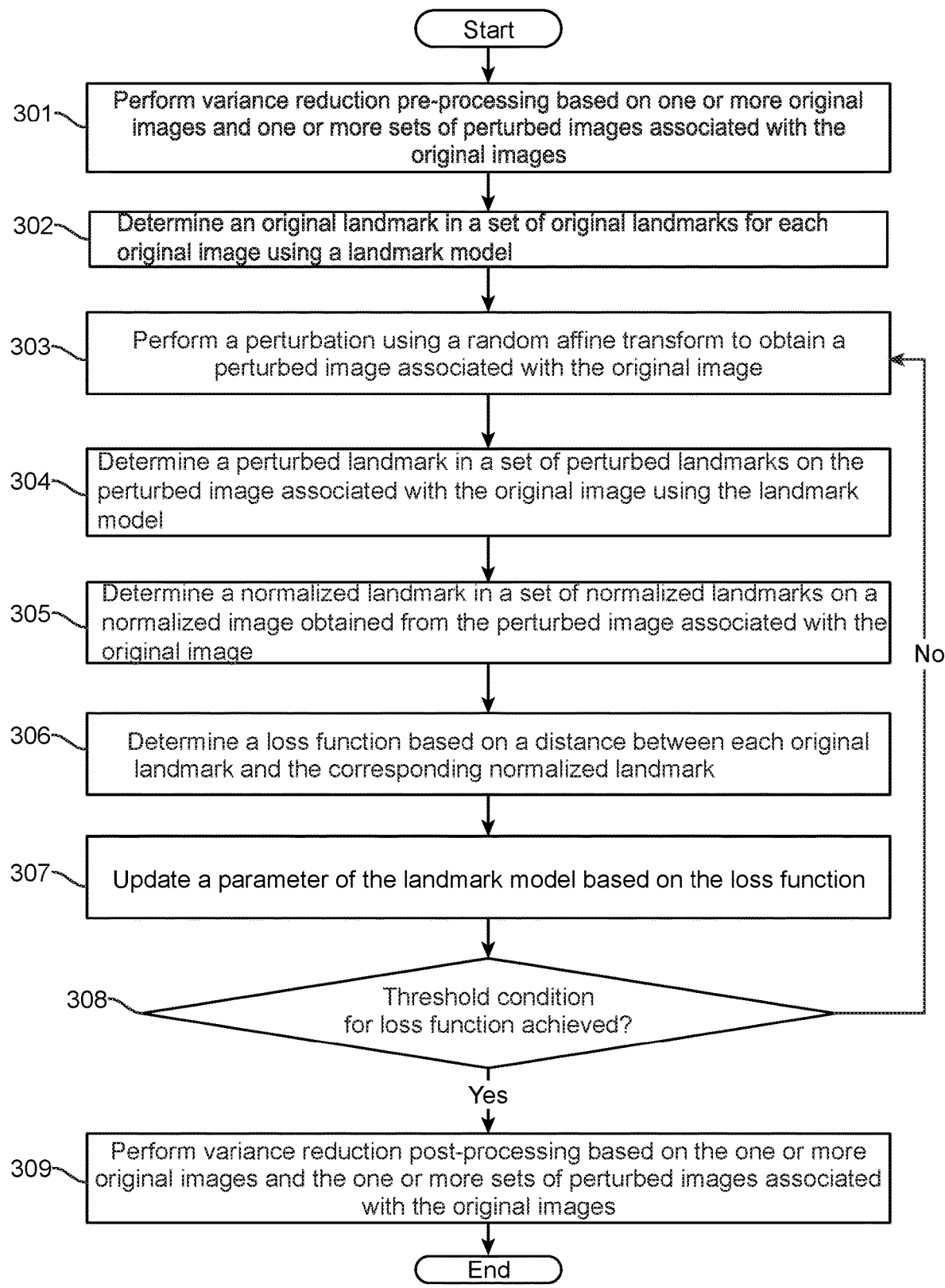
FIG. 3 is a flowchart of method steps for a stabilization procedure performed by the training engine and execution engine of FIG. 1, according to various embodiments of the present disclosure.

FIG. 3 is a flowchart of method steps for a stabilization procedure performed by the training engine 122 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 301, training engine 122 uses variance reduction pre-processing module 230 to perform variance reduction pre-processing based on one or more original images and one or more sets of perturbed images associated with the original images. The variance reduction pre-processing is performed in a manner similar to that disclosed above with respect to variance reduction pre-processing module 230, and as further described below with regards to FIG. 4. For instance, variance reduction pre-processing module 230 uses landmark model 210 to localize landmarks in each original image and in a set of perturbed images associated with the original image. In another instance, variance reduction pre-processing module 230 uses transform module 220 to generate a set of normalized images and then averages the landmark coordinates for each normalized landmark in the set of normalized landmarks. Variance reduction pre-processing module 230 determines a variance between landmark coordinates for each landmark in the original image and the average landmark coordinate for each corresponding normalized landmark. Variance reduction pre-processing module 230 updates a set of reference landmarks using the set of normalized landmarks.

In step 302, training engine 122 determines an original landmark in a set of original landmarks for each original image using a landmark model 210. The original image includes an image selected from original image(s) 281. The original landmark is determined in a manner similar to that disclosed above with respect to landmark model 210. For instance, landmark model 210 computes original landmarks 261, including a set of original landmarks L in the original image defined as follows:

$$L=[P_1(I),P_2(I),\ldots,P_n(I)] \quad (2)$$

In step 303, training engine 122 uses transform module 220 to perform a perturbation using a random affine transform to obtain a perturbed image associated with the original image. The perturbation is performed in a manner similar to that disclosed above with respect to transform module 220. The perturbations include one or more random affine transforms T, such as translation, scaling, rotation, and/or the like. In some embodiments, transform module 220 obtains a perturbed image by perturbing a bounding box associated with the original image.

In step 304, training engine 122 determines a perturbed landmark in a set of perturbed landmarks on the perturbed image associated with the original image using the landmark model 210. The perturbed landmark is determined in a manner similar to that disclosed above with respect to landmark model 210. For instance, landmark model 210 computes perturbed landmarks 262, including a set of perturbed landmarks L' in the perturbed image defined as follows:

$$L'=[P_1(T),P_2(T),\ldots,P_n(T)] \quad (3)$$

In step 305, training engine 122 uses landmark model 210 to determine a normalized landmark in a set of normalized landmarks on a normalized image obtained from the perturbed image associated with the original image. The normalized image is obtained in a manner similar to that disclosed above with respect to transform module 220. For instance, training engine 122 uses transform module 220 to obtain a normalized image by applying to the perturbed image an inverse transform of the random affine transform. In another instance, training engine 122 uses transform module 220 to obtain the normalized image by resizing, shifting, or rotating the perturbed image so that one or more positions of the facial features match the positions in the original image.

Once the normalized image is obtained, the normalized landmark is determined in a manner similar to that disclosed above with respect to landmark model 210. For instance, landmark model 210 obtains normalized landmarks 263, including a set of normalized landmarks L" in the original coordinate space, by applying an inverse transform of the random affine transform T, resulting in normalized landmarks L" in a normalized image defined as follows:

$$L''=T^{-1}(L')=[T^{-1}P_1(T),T^{-1}P_2(T),\ldots,T^{-1}P_n(T)] \quad (4)$$

In step 306, training engine 122 uses image stabilization loss module 240 to determine a loss function based on a distance between the original landmark and the corresponding normalized landmark. The loss function is determined in a manner similar to that disclosed above with respect to image stabilization loss module 240. For instance, the difference between in the localized landmarks in original image and the normalized image may be calculated to obtain an error using the following equation:

$$\begin{bmatrix} P_1 \\ P_2 \\ \ldots \\ P_n \end{bmatrix} - \begin{bmatrix} T^{-1}(P'_1) \\ T^{-1}(P'_2) \\ \ldots \\ T^{-1}(P'_n) \end{bmatrix} = \begin{bmatrix} R_1 \\ R_2 \\ \ldots \\ R_n \end{bmatrix} \quad (5)$$

In some embodiments, image stabilization loss module 240 calculates an error associated with accuracy of landmark model 210 based on the difference between the landmarks L localized in the original image and the improved ground truth reference, L*(I) produced by variance reduction pre-processing module 230.

In some embodiments, such as when a self-supervised learning techniques is used, for a set of N images I, the loss function can be determined by the following equation:

$$\mathcal{L}_f(\theta) = \frac{1}{N} \sum_{I \in |T|} G(I; f, \theta) + w_{ISL} R(I; f, \theta) \qquad (6)$$

In step 307, training engine 122 uses image stabilization loss module 240 to update a parameter of landmark model 210 based on the loss function. The parameter of landmark model 210 is updated in a manner similar to that disclosed above with respect to image stabilization loss module 240. In some embodiments, image stabilization loss module 240 computes the gradient of the loss function with respect to the weights of the neural network comprising landmark model 210, and updates the weights by taking a step in a direction opposite to the gradient. In some embodiments, image stabilization loss module 240 updates the model parameters of landmark model 210 at each training iteration to reduce the value of the mean squared error for the loss function. In some embodiments, the update is performed by propagating the loss backwards through landmark model 210 to adjust parameters of the model or weights on connections between neurons of the neural network.

In step 308, training engine 122 uses image stabilization loss module 240 to determine whether a threshold condition for loss function is achieved. In some embodiments, the threshold condition is achieved when the training process reaches convergence. In some embodiments, the threshold condition is a predetermined value or range for the mean squared error associated with the loss function. In some embodiments, the threshold condition is a predetermined value or range for the error associated with stability of landmark model 210. In some embodiments, the threshold condition is a certain number of iterations of the training process, a predetermined amount of time, or the like.

When the threshold condition is achieved, the training engine 122 advances the stabilization procedure to step 309. When the threshold condition has not been achieved, the training engine repeats a portion of the stabilization procedure beginning with step 303.

In step 309, execution engine 124 uses variance reduction post-processing module 250 to perform variance reduction post-processing based on the one or more original images and the one or more sets of perturbed images associated with the original images. The variance reduction post-processing is performed in a manner similar to that disclosed above with respect to variance reduction post-processing module 250. For instance, variance reduction post-processing module 250 uses landmark model 210 to localize landmarks in each original image, and in a set of perturbed images associated with the original image. In another instance, variance reduction post-processing module 250 uses transform module 220 to generate a set of normalized images, and then averages the landmark coordinates for each normalized landmark in the set of normalized landmarks. Variance reduction post-processing module 250 updates landmarks output by landmark model 210 using the obtained set of normalized landmarks.

Figure 4:
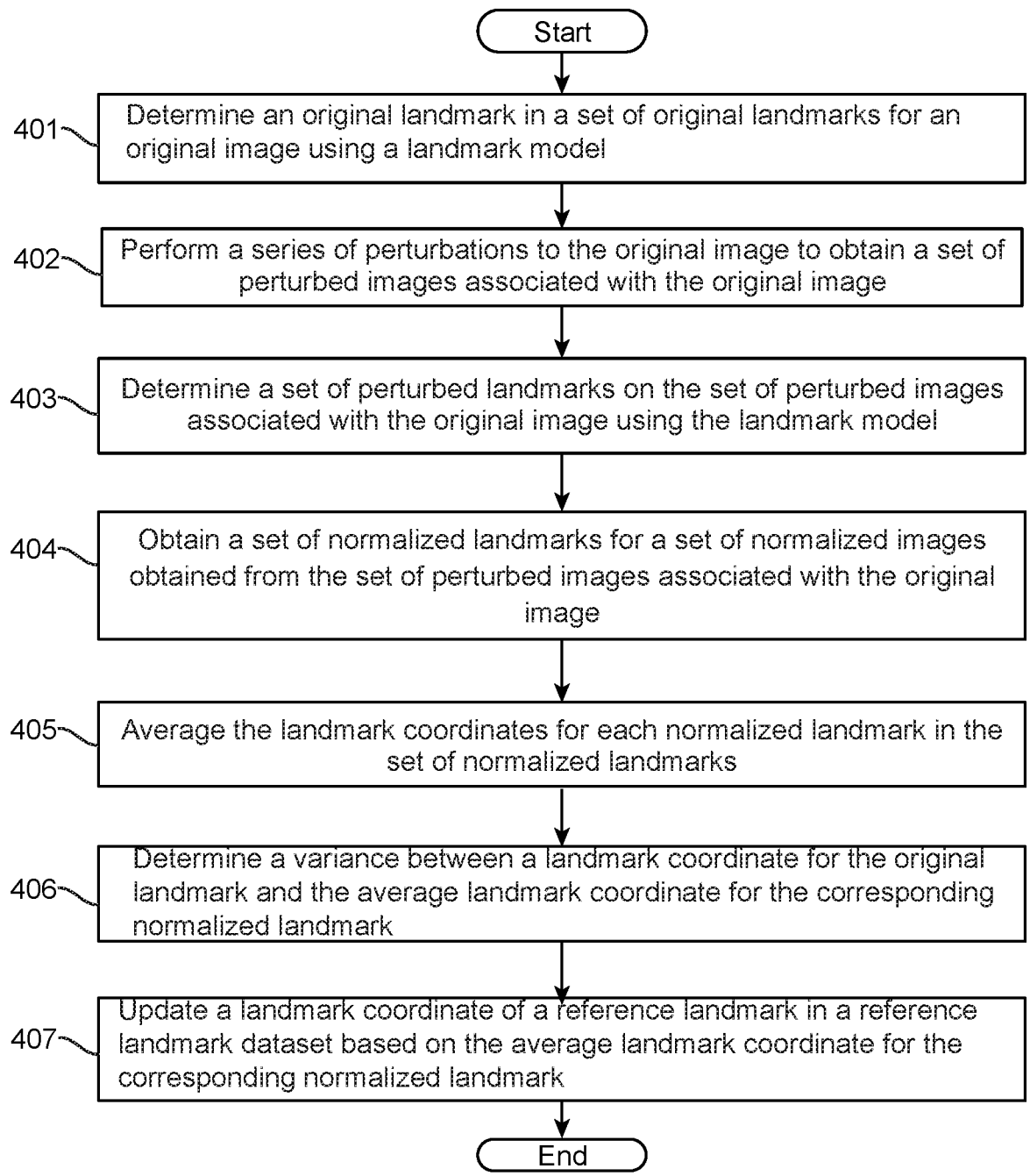
FIG. 4 is a flowchart of method steps for a variance reduction procedure performed by the training engine and execution engine of FIG. 1, according to various embodiments of the present disclosure.

FIG. 4 is a flowchart of method steps for a variance reduction procedure performed by the training engine 122 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 401, training engine 122 determines an original landmark in a set of original landmarks for an original image using a landmark model 210. Original image includes an image selected from original image(s) 281. The original landmark is determined in a manner similar to that disclosed above with respect to landmark model 210. For instance, landmark model 210 computes original landmarks 261, including a set of original landmarks L in the original image defined as follows:

$$L = [P_1(I), P_2(I), \ldots, P_n(I)] \qquad (2)$$

In step 402, training engine 122 uses transform module 220 to perform a series of perturbations to the original image to obtain a set of perturbed images associated with the original image. The series of perturbations is performed in a manner similar to that disclosed above with respect to transform module 220. The perturbations include one or more random affine transforms T, such as translation, scaling, rotation, and/or the like. In some embodiments, transform module 220 obtains each perturbed image by perturbing a bounding box associated with the original image.

In step 403, training engine 122 determines a set of perturbed landmarks on the set of perturbed images associated with the original image using landmark model 210. The set of perturbed landmarks is localized in a manner similar to that disclosed above with respect to transform module 220. In some embodiments, the set of perturbed landmarks is an initial guess or estimate of the predicted locations of facial landmarks on the set of perturbed images.

In step 404, training engine 122 uses landmark model 210 to obtain a set of normalized landmarks for a set of normalized images obtained from the set of perturbed images associated with the original image. Each normalized landmark in the set of normalized landmarks is obtained in a manner similar to that disclosed above with respect to transform module 220. Each normalized landmark in the normalized image represents the coordinate for each corresponding perturbed landmark in the original coordinate space.

In step 405, training engine 122 uses variance reduction pre-processing module 230 to average the landmark coordinates for each normalized landmark in the set of normalized landmarks. The average landmark coordinate is obtained in a manner similar to that disclosed above with respect to variance reduction pre-processing module 230. Variance reduction pre-processing module 230 calculates an average or mean coordinate for each landmark in the set of normalized landmarks. In some embodiments, variance reduction pre-processing module 230 trains landmark model 210 multiple times on a plurality of perturbed images associated with the original image, normalizes the perturbed images to obtain a plurality of normalized images, obtains a plurality of normalized landmarks for each normalized image, and averages the obtained results for each normalized landmark.

In step 406, training engine 122 uses variance reduction pre-processing module 230 to determine a variance between a landmark coordinate for the original landmark and the average landmark coordinate for the corresponding normalized landmark. The variance is obtained in a manner similar to that disclosed above with respect to variance reduction pre-processing module 230. For instance, variance reduction pre-processing module 230 determines a distance between the one or more statistical parameters associated with landmark coordinates of each original landmark 261 and the average or mean coordinate for each landmark in the set of normalized landmarks 263.

In step 407, training engine 122 updates a landmark coordinate of a reference landmark in a reference landmark dataset based on the average landmark coordinate for the corresponding normalized landmark. The update is performed in a manner similar to that disclosed above with respect to variance reduction pre-processing module 230. In some embodiments, the set of reference landmarks is based on the localized landmarks in the original image. In some embodiments, the set of reference landmarks is used to produce an improved ground truth reference, L*(I), for each image.

Figure 5:
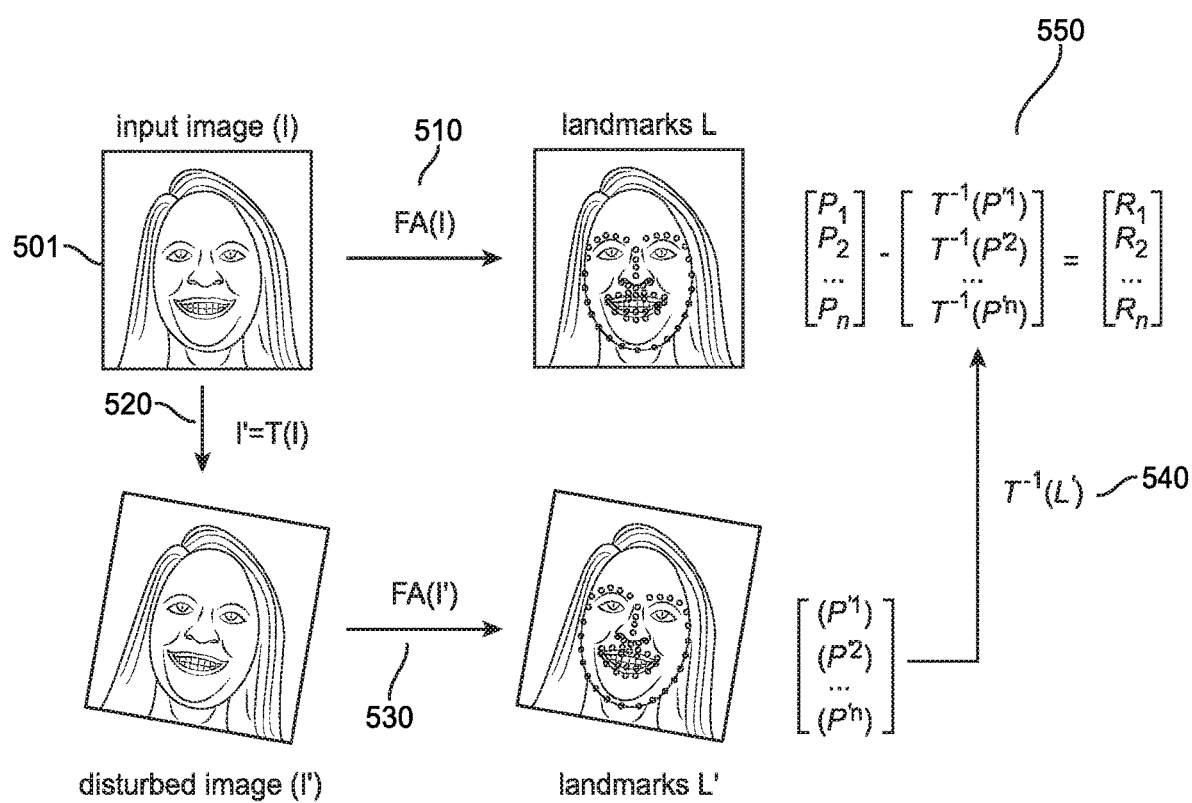
FIG. 5 is an illustration of a facial image stabilization procedure, according to various embodiments of the present disclosure.

FIG. 5 is an illustration of a facial image stabilization procedure, according to various embodiments of the present disclosure.

In step 510, landmark model 210 computes a set of original landmarks L for an original image, such as input image (I). Input image (I) includes a bounding box 501. Each original landmark L is determined in a manner similar to that disclosed above with respect to landmark model 210. For instance, landmark model 210 computes original landmarks 261, including a set of original landmarks L in the original image defined as follows:

$$L=[P_1(I), P_2(I), \ldots, P_n(I)] \quad (2)$$

In step 520, transform module 220 performs a perturbation on the original image using a random affine transform T to obtain a perturbed image associated with the original image, such as disturbed image (I'). The perturbation is performed in a manner similar to that disclosed above with respect to transform module 220. The perturbations include one or more random affine transforms T, such as translation, scaling, rotation, and/or the like. In some embodiments, transform module 220 obtains a perturbed image associated with the original image by perturbing a bounding box associated with the original image.

In step 530, landmark model 210 obtains a set of perturbed landmarks L' on the perturbed image associated with the original image. Each perturbed landmark L' is determined in a manner similar to that disclosed above with respect to landmark model 210. For instance, landmark model 210 computes perturbed landmarks 262, including a set of perturbed landmarks L' in the perturbed image associated with the original image defined as follows:

$$L'=[P_1(I'), P_2(I'), \ldots, P_n(I')] \quad (3)$$

In step 540, landmark model 210 determines a set of normalized landmarks $T^{-1}(L')$ (L") on a normalized image obtained from the perturbed image associated with the original image. The normalized image is obtained in a manner similar to that disclosed above with respect to transform module 220. For instance, training engine 122 uses transform module 220 to obtain a normalized image by applying to the perturbed image an inverse transform $T^{-1}$ of the random affine transform T. Once the normalized image is obtained, the normalized landmark is determined in a manner similar to that disclosed above with respect to landmark model 210. For instance, landmark model 210 obtains normalized landmarks 263, including a set of normalized landmarks L" in the original coordinate space, by applying an inverse transform of the random affine transform T, resulting in normalized landmarks L" in a normalized image defined as follows:

$$L''=T^{-1}(L')=[T^{-1}P_1(I'), T^{-1}P_2(I'), \ldots, T^{-1}P_n(I')] \quad (4)$$

In step 550, image stabilization loss module 240 determines a loss function based on a distance between the set of original landmarks L and the set of normalized landmarks L". The loss function is determined in a manner similar to that disclosed above with respect to image stabilization loss module 240. For instance, the difference between in the localized landmarks in original image and the normalized image may be calculated to obtain an error using the following equation:

$$\begin{bmatrix} P_1 \\ P_2 \\ \ldots \\ P_n \end{bmatrix} - \begin{bmatrix} T^{-1}(P'_1) \\ T^{-1}(P'_2) \\ \ldots \\ T^{-1}(P'_n) \end{bmatrix} = \begin{bmatrix} R_1 \\ R_2 \\ \ldots \\ R_n \end{bmatrix} \quad (5)$$

Figure 6A:
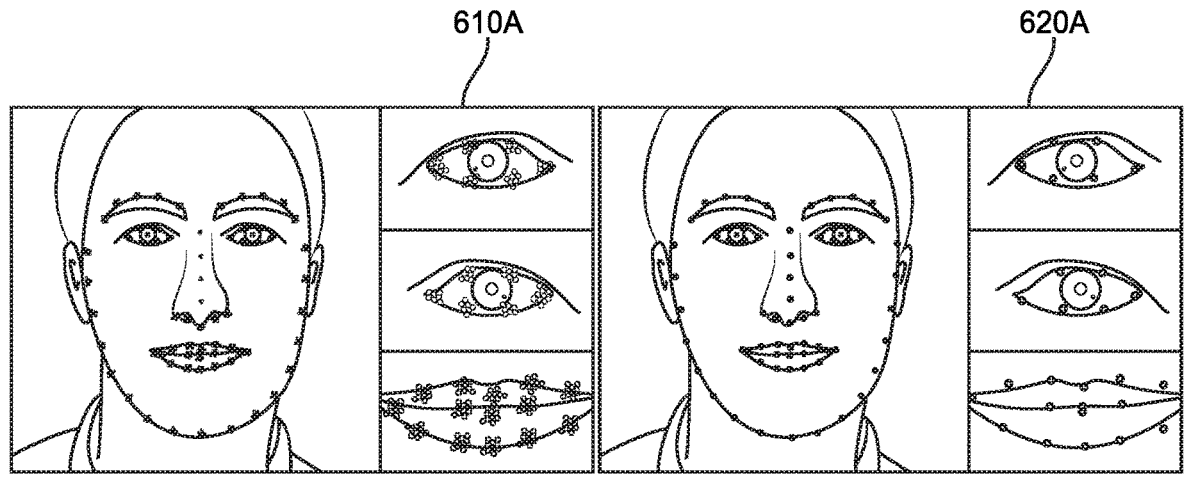
FIG. 6A illustrates an examples landmark localization results generated by the training engine and execution engine of FIG. 1, according to various embodiments of the present disclosure.
Figure 6B:
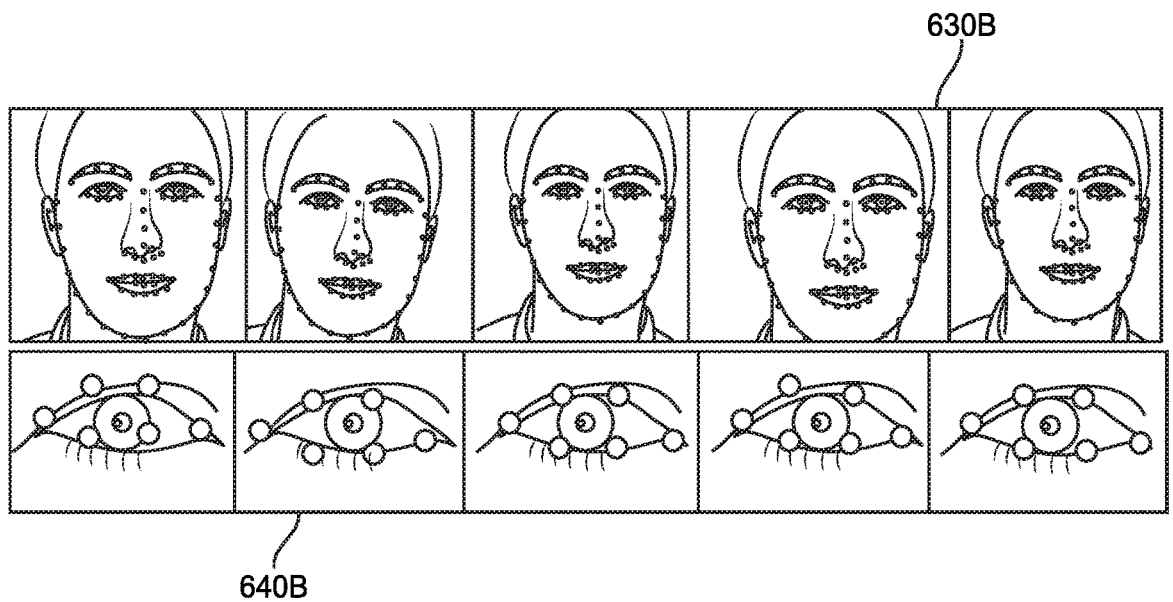
FIG. 6B illustrates an example of landmark localization results after a series of perturbations, according to various embodiments of the present disclosure.

FIGS. 6A and 6B are illustrations of exemplary landmark localization results, according to various embodiments of the present disclosure.

FIG. 6A illustrates an example of landmarks, such as facial landmarks, produced by a baseline landmark model versus a trained landmark model, such as landmark model 210, generated by training engine 122. 610A illustrates the initial landmarks produced a baseline landmark model. The initial landmarks illustrate the estimated landmarks with respect to the face depicted in the image. The initial landmarks illustrate a certain amount of variance in the estimated landmarks relative to the anatomically defined points on the face.

620A illustrates the final landmarks produced by a trained landmark model, such as landmark model 210, generated by training engine 122. In some embodiments, the training engine 122 repeats the training a certain number of times (such as 10 or 20 times) with a certain amount of perturbations (e.g., scaling, rotation, translation, or the like) to an image. The final landmarks illustrate improvement in the temporal stability of the facial landmarks with respect to the image compared to the initial landmarks produced by the baseline landmark model. The variation of the estimated landmarks relative to the anatomically defined points on the face depicted in the image is much smaller in the final landmarks compared to the variation noticed in the initial landmarks.

FIG. 6B illustrates example of landmarks, such as facial landmarks, produced by a baseline landmark model through a series of perturbations (e.g., four perturbations). 630B presents a set of landmarks assigned to an original image, such as a fixed image depicting a face. 630B also presents a set of landmarks assigned to the image after each perturbation in a series of four perturbations. As illustrated, the perturbations of the image can cause assignment of landmarks to shift relative to the depicted face. 630B illustrates improvement in the temporal stability of the facial landmarks assigned to the image after each perturbation. The variation of the estimated landmarks relative to the anatomically defined points on the face depicted in the image is much smaller after each perturbation.

640B presents a set of landmarks assigned to a facial characteristic on an original image (e.g., a generic eye position, or the like). 640B also presents a set of landmarks assigned to the facial characteristic after each perturbation in a series of four perturbations. As illustrated, the perturbations of the image can cause assignment of landmarks to shift relative to the eye position. 640B illustrates improvement in the temporal stability of the facial landmarks assigned to the facial characteristic after each perturbation.

The variation of the estimated landmarks relative to the anatomically defined position of the facial characteristic is much smaller after each perturbation.

In sum, image stabilization loss module 240 uses landmark model 210 to localize original landmarks 261 in an original image, perturbed landmarks 262 in perturbed image associated with the original image, and normalized landmarks 263 derived based on the landmarks in the perturbed image. In one instance, image stabilization loss module 240 calculates an error associated with stability of landmark model 210 based on the difference between the original landmarks 261 and the normalized landmarks 263. In another instance, image stabilization loss module 240 calculates an error associated with accuracy of landmark model 210 based on the difference between the original landmarks 261 and the set of reference landmarks produced by variance reduction pre-processing module 230. Image stabilization loss module 240 trains landmark model 210 in order to minimize a loss function. In some embodiments, image stabilization loss module 240 repeats the training process for multiple iterations until the training process reaches convergence, as further described below. For instance, convergence is reached when the mean squared error for the loss function changes very little or not at all with each iteration of the training process. In another instance, convergence is reached when the mean squared error for the loss function stays constant after a certain number of iterations. Once training is complete, variance reduction post-processing module 250 further stabilizes the final results obtained by the image stabilization loss module 240 in a manner similar to that disclosed above with respect to variance reduction pre-processing module 230.

In some embodiments, variance reduction pre-processing module 230 and variance reduction post-processing module 250 reduce the variance in landmarks generated by landmark model 210. During the variance reduction processing, landmark model 210 computes a set of original landmarks in an original image 281. Transform module 220 performs one or more perturbations on the original image 281 to obtain a set of perturbed images associated with the original image. Transform module 220 obtains a set of normalized landmarks in a set of normalized images. Variance reduction pre-processing module 230 or variance reduction post-processing module 250 average the landmark coordinates in the set of normalized landmarks. In some embodiments, variance reduction pre-processing module 230 updates a set of reference landmarks using the set of normalized landmarks. In other embodiments, when the threshold condition is achieved, variance reduction post-processing module 250 updates landmarks output by landmark model 210 using the obtained set of normalized landmarks.

The disclosed techniques achieve various advantages over prior-art techniques. In particular, landmark models trained using disclosed techniques achieve stable results in various applications that require handling of high-resolution video sequences, real-time landmark tracking, or the like. For instance, disclosed methods do not require complex and expensive optical flow computations, thereby achieving improved accuracy and temporal stability with greater computational efficiency relative to prior-art approaches. Further, disclosed techniques are simple to implement, with the stabilization loss used in training incurring minimal, if any, overheard. Further, in various embodiments, the disclosed methods do not rely on sequential data, labeled data, or video sequences. Rather, the disclosed techniques may rely, for instance, on a data set consisting of a set of unlabeled face images, and can therefore be generalized to unseen data. Since the disclosed techniques are not limited to video data, the approach allows for a much wider variety of data that can be used for training the underlying model. In addition, disclosed methods are largely agnostic to the underlying model used to assign facial landmarks. As a result, the disclosed methods may be applicable to any trainable landmark model in order to fine-tune the model to achieve high accuracy and temporal stability. Additionally, disclosed techniques artificially create and resolve landmark instability in individual images, thereby increasing the landmark models' robustness against image perturbations. These technical advantages provide one or more technological advancements over prior art approaches.

1. In some embodiments, a computer-implemented method for training a landmark model comprises: determining, using the landmark model, a first landmark in a set of first landmarks associated with a first image; performing, on the first image, a first perturbation to obtain a second image; determining, using the landmark model, a second landmark in a set of second landmarks associated with the second image; determining, based on a first distance between the first landmark and the second landmark, a first loss function; and updating, based on the first loss function, a first parameter of the landmark model.

2. The computer-implemented method of clause 1, further comprising: determining, based on the first loss function, whether a threshold condition is achieved.

3. The computer-implemented method of clauses 1 or 2, wherein the threshold condition is a predetermined value or range for a mean squared error associated with the first loss function.

4. The computer-implemented method of any of clauses 1-3, wherein the first perturbation is a random affine transform comprising at least one of translation, scaling, or rotation.

5. The computer-implemented method of any of clauses 1-4, further comprising performing an inverse transform of a random affine transform on the second image to obtain a normalized image, wherein determining the second landmark comprises inputting the normalized image into the landmark model to determine the second landmark, wherein the second landmark corresponds to a position within the normalized image.

6. The computer-implemented method of any of clauses 1-5, further comprising: determining a second distance between the first landmark and a ground truth landmark in a set of ground truth landmarks; and updating the first loss function based on the second distance.

7. The computer-implemented method of any of clauses 1-6, further comprising: generating a set of normalized images from a set of perturbed images obtained by performing one or more perturbations on the first image; and determining an average landmark coordinate based on the set of normalized images.

8. The computer-implemented method of any of clauses 1-7, wherein the third landmark comprises a ground truth landmark.

9. The computer-implemented method of any of clauses 1-8, wherein the set of perturbations is performed on a bounding box of the first image.

10. The computer-implemented method of any of clauses 1-9, wherein the first variance is determined prior to performing the first perturbation or after updating the first parameter of the landmark model.

11. In some embodiments, a non-transitory computer readable medium stores instructions that, when executed by a processor, cause the processor to perform the steps of:

determining, using a landmark model, a first landmark in a set of first landmarks associated with a first image; performing, on the first image, a first perturbation to obtain a second image; determining, using the landmark model, a second landmark in a set of second landmarks associated with the second image; determining, based on a first distance between the first landmark and the second landmark, a first loss function; and updating, based on the first loss function, a first parameter of the landmark model.

12. The non-transitory computer readable medium of clause 11, further comprising: determining, based on the first loss function, whether a threshold condition is achieved.

13. The non-transitory computer readable medium of clauses 11 or 12, wherein the threshold condition is a predetermined value or range for a mean squared error associated with the first loss function.

14. The non-transitory computer readable medium of any of clauses 11-13, wherein the first perturbation is a random affine transform comprising at least one of translation, scaling, or rotation.

15. The non-transitory computer readable medium of any of clauses 11-14, further comprising performing an inverse transform of a random affine transform on the second image to obtain a normalized image, wherein determining the second landmark comprises inputting the normalized image into the landmark model to determine the second landmark, wherein the second landmark corresponds to a position within the normalized image.

16. The non-transitory computer readable medium of any of clauses 11-15, further comprising: determining a second distance between the first landmark and a ground truth landmark in a set of ground truth landmarks; and updating the first loss function based on the second distance.

17. The non-transitory computer readable medium of any of clauses 11-16, further comprising: generating a set of normalized images from a set of perturbed images obtained by performing one or more perturbations on the first image; and determining an average landmark coordinate based on the set of normalized images.

18. The non-transitory computer readable medium of any of clauses 11-17, wherein the set of perturbations is performed on a bounding box of the first image.

19. The non-transitory computer readable medium of any of clauses 11-18, wherein the first variance is determined prior to performing the first perturbation or after updating the first parameter of the landmark model.

20. In some embodiments, a system comprises: a memory storing one or more software applications; and a processor that, when executing the one or more software applications, is configured to perform the steps of: determining, using a landmark model, a first landmark in a set of first landmarks associated with a first image; performing, on the first image, a first perturbation to obtain a second image; determining, using the landmark model, a second landmark in a set of second landmarks associated with the second image; determining, based on a first distance between the first landmark and the second landmark, a first loss function; and updating, based on the first loss function, a first parameter of the landmark model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a landmark model, the method comprising:
   determining, using the landmark model, a first landmark in a set of first landmarks associated with a first image;
   performing, on the first image, a first perturbation to obtain a second image;
   performing an inverse transform of the first perturbation on the second image to obtain a normalized image;
   determining, using the landmark model, a second landmark in a set of second landmarks associated with the normalized image;
   determining, based on a first distance between the first landmark and the second landmark, a first loss function; and
   updating, based on the first loss function, a first parameter of the landmark model.

2. The computer-implemented method of claim 1, further comprising:
   determining, based on the first loss function, whether a threshold condition is achieved.

3. The computer-implemented method of claim 2, wherein the threshold condition is a predetermined value or range for a mean squared error associated with the first loss function.

4. The computer-implemented method of claim 1, wherein the first perturbation is a random affine transform comprising at least one of translation, scaling, or rotation.

5. The computer-implemented method of claim 1, wherein the second landmark corresponds to a position within the normalized image.

6. The computer-implemented method of claim 1, further comprising:
   determining a second distance between the first landmark and a ground truth landmark in a set of ground truth landmarks; and
   updating the first loss function based on the second distance.

7. The computer-implemented method of claim 1, further comprising:
   generating a set of normalized images from a set of perturbed images obtained by performing one or more perturbations on the first image; and
   determining an average landmark coordinate based on the set of normalized images.

8. The computer-implemented method of claim 7, further comprising:
   updating a ground truth landmark based on a first variance between the first landmark and the average landmark coordinate.

9. The computer-implemented method of claim 8, wherein the first variance is determined prior to performing the first perturbation or after updating the first parameter of the landmark model.

10. The computer-implemented method of claim 7, wherein the one or more perturbations are performed on a bounding box of the first image.

11. A non-transitory computer readable medium storing instructions that, when
    executed by a processor, cause the processor to perform the steps of:
    determining, using a landmark model, a first landmark in a set of first landmarks associated with a first image;
    performing, on the first image, a first perturbation to obtain a second image;
    performing an inverse transform of the first perturbation on the second image to obtain a normalized image;
    determining, using the landmark model, a second landmark in a set of second landmarks associated with the normalized image;
    determining, based on a first distance between the first landmark and the second landmark, a first loss function; and
    updating, based on the first loss function, a first parameter of the landmark model.

12. The non-transitory computer readable medium of claim 11, further comprising:
    determining, based on the first loss function, whether a threshold condition is achieved.

13. The non-transitory computer readable medium of claim 12, wherein the threshold condition is a predetermined value or range for a mean squared error associated with the first loss function.

14. The non-transitory computer readable medium of claim 11, wherein the first perturbation is a random affine transform comprising at least one of translation, scaling, or rotation.

15. The non-transitory computer readable medium of claim 11, wherein the second landmark corresponds to a position within the normalized image.

16. The non-transitory computer readable medium of claim 11, further comprising:
    determining a second distance between the first landmark and a ground truth landmark in a set of ground truth landmarks; and
    updating the first loss function based on the second distance.

17. The non-transitory computer readable medium of claim 11, further comprising:
    generating a set of normalized images from a set of perturbed images obtained by performing one or more perturbations on the first image; and
    determining an average landmark coordinate based on the set of normalized images.

18. The non-transitory computer readable medium of claim 17, wherein the one or more perturbations are performed on a bounding box of the first image.

19. The non-transitory computer readable medium of claim 17, further comprising:
    updating a ground truth landmark based on a first variance between the first landmark and the average landmark coordinate, wherein the first variance is determined prior to performing the first perturbation or after updating the first parameter of the landmark model.

20. A system, comprising:
a memory storing one or more software applications; and
a processor that, when executing the one or more software applications, is configured to perform the steps of:
- determining, using a landmark model, a first landmark in a set of first landmarks associated with a first image;
- performing, on the first image, a first perturbation to obtain a second image;
- performing an inverse transform of the first perturbation on the second image to obtain a normalized image;
- determining, using the landmark model, a second landmark in a set of second landmarks associated with the normalized image;
- determining, based on a first distance between the first landmark and the second landmark, a first loss function; and
- updating, based on the first loss function, a first parameter of the landmark model.

* * * * *